United States Patent Office 3,250,811
Patented May 10, 1966

3,250,811
METHYLOL DERIVATIVES OF TRIS(2-CARBAMOYLETHYL)PHOSPHINE OXIDE
Leon H. Chance, New Orleans, and George L. Drake, Jr., and Wilson A. Reeves, Metairie, La., assignors to the United States of America as represented by the Secretary of Agriculture
No Drawing. Filed Feb. 8, 1963, Ser. No. 257,343
2 Claims. (Cl. 260—561)
(Granted under Title 35, U.S. Code (1952), sec. 266)

A nonexclusive, irrevocable, royalty-free license in the invention herein described, throughout the world for all purposes of the United States Government, with the power to grant sublicenses for such purposes, is hereby granted to the Government of the United States of America.

This invention relates to a process for preparing tris(2-carbamoylethyl)phosphine oxide which compound has the formula

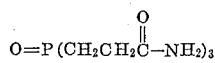
$$O=P(CH_2CH_2C-NH_2)_3$$ (with C=O)

to its N-methylol derivatives, and to the use of these compounds for the preparation of new modified cellulosic textiles. The methylol derivatives have been found to be effective as fire retardants and can be used for the treatment of normally flammable cellulosic materials to increase their resistance to combustion and burning. They also impart crease resistance, rot resistance, and dimensional stability to cellulosic fibers.

Tris(2-carbamoylethyl)phosphine oxide may be prepared by reacting ammonia with tris(2-carbethoxyethyl)phosphine oxide of the formula

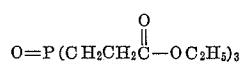
$$O=P(CH_2CH_2C-OC_2H_5)_3$$ (with C=O)

The reaction may be carried out over a temperature range of from about 25° to 100° C. with the formation of the desired product and ethanol. The reaction proceeds more rapidly at the higher temperatures, and in some cases at the higher temperatures it is desirable to carry out the reaction at pressures greater than atmospheric pressure.

The reaction is carried out in the presence of aqueous ammonia. Upon completion of the reaction, the desired product may be separated by evaporation of the solvent and extracting the viscous residue with hot alcohol until the residue crystallizes. The product is a white crystalline compound.

According to the invention the process involves reacting tris(2-carbamoylethyl)phosphine oxide of the formula

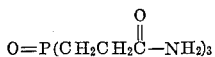
$$O=P(CH_2CH_2C-NH_2)_3$$ (with C=O)

with formaldehyde within a range of mole ratios of from 1:1 to 1:6 to form N-methylol derivatives, impregnating cellulosic textiles with an aqueous solution of the N-methylol derivatives, and heating the cellulosic textiles to polymerize the N-methylol derivatives on and within the fibers of the cellulosic textiles and to crosslink the cellulose molecules of said fibers. The thus modified cellulosic textiles are rot-, crease-, flame-, and shrink-resistant.

The methylol derivatives of tris(2-carbamoylethyl)phosphine oxide can be prepared by any of the known methods of making methylol amides. In general they are prepared by reacting formaldehyde with the amide in acidic or alkaline media. Alkaline conditions are preferred for the preparation of the methylol derivatives. In an acid system the formaldehyde reacts with the amide to form the water soluble methylol derivatives; then these begin to condense to form insoluble flame resistant polymers. The reaction with formaldehyde is best carried out in aqueous alkaline media. Suitable catalysts include sodium, potassium, and calcium hydroxide, and sodium and potassium carbonate. Six moles of formaldehyde per mole of tris(2-carbamoylethyl)phosphine oxide can react but the derivatives containing one, two, or three methylol groups are the most stable. Best results are obtained on a cellulosic textile when three moles of formaldehyde react.

Simultaneous polymerization within and crosslinking of the cellulose molecules of the fibers provided by this invention are produced in the presence of an acid catalyst. Catalysts suitable for the invention are those conventionally used in applying methylol amides to cellulosic textiles which are Lewis and protonic acids. They include latent acid catalysts such as magnesium chloride, zinc nitrate, zinc fluoborate, and amine hydrochlorides. Surface active agents, water repellents, and other textile treating agents may be incorporated in the aqueous treating medium to modify the treated textile. For example, the wrinkle resistance, tearing strength, and abrasion resistance can be improved by incorporating softening agents or water repellents in the treating media.

Cellulosic textile fibers, yarns, and fabrics can be made flame-, crease-, rot-, mildew-, and shrink-resistant in accordance with this invention. The process consists essentially of impregnating the textile materials with an aqueous solution of the methylol derivatives and curing the impregnated materials at the temperatures conventionally used for curing cellulosic textiles. The time and temperature required for curing is partially dependent upon the weight of the fabric being treated. The temperature can range from about 100° C. up to about 170° C. The time can vary from less than one minute up to about 30 minutes. The rapid cures are accomplished at the higher temperatures.

When a cotton textile is being treated it is of advantage to pass it through the impregnating liquor and remove the excess liquor by passing the textile through squeeze rolls. It is also advantageous to dry the textile at a temperature of about 60° to 120° C. before curing it at from about 140° to 170° C. for 10 to 1 minute using the longer time with the lower temperature.

The degree of flame resistance and crease resistance can be varied from a low degree to a high degree by varying the amount of polymer and crosslinking put into the textile. Considerable improvement in dimensional stability is obtained with as little as 1% add-on of the finish. About 3 to 15% add-on is needed for a high degree of improvement in crease resistance and smooth drying properties of a cotton fabric.

Some advantages of cotton textiles treated in accordance with this invention are: flame and glow resistance, shrink resistance, rot and mildew resistance, crease resistance, and permanence to laundering and dry cleaning.

The following examples are illustrative of the invention: All parts are by weight.

Example 1

Tris(2-carbethoxyethyl)phosphine oxide (12.0 parts) and concentrated aqueous ammonia containing 28.7% ammonia (10.0 parts) were stirred at room temperature (26°–28° C.) until the two layers became homogeneous. The solution was concentrated by evaporation on a steam bath until a viscous liquid remained. The viscous liquid was washed repeatedly by boiling in ethanol until it solidified to a white crystalline material. The material was recrystallized from dimethyl formamide. Infrared absorption data showed the presence of phosphine oxide and amide groups.

*Example 2*

Tris(2-carbamoylethyl)phosphine oxide (2.6 parts) was added to water (10 parts). Aqueous formaldehyde (2.7 parts of 36.3% formaldehyde) was added and the pH adjusted to 11 with dilute sodium hydroxide solution. The solution was allowed to stand for about 20 hours at room temperature. The mole ratio of the phosphine oxide to formaldehyde was 1:3. The resulting solution consisted largely of the trimethylol derivative of tris(2-carbamoylethyl)phosphine oxide.

*Example 3*

The solution obtained from Example 2 was adjusted to a pH of 4.5 with concentrated hydrochloric acid. Magnesium chloride hexahydrate (0.33 part) was added and the solution diluted with water (6.4 parts). The resulting solution contained approximately 16% of the trimethylol derivative and 1.5% magnesium chloride hexahydrate. Cotton print cloth was immersed in the solution and the excess squeezed out by passing through padder rolls. The fabric was dried in a forced draft oven for 5 minutes at 60° C. and then cured at 160° C. for 3 minutes. The fabric was washed and dried. It exhibited good flame resistance, had no afterglow, and left a tough charred material which retained the fabric structure. The fabric was also wrinkle resistant and shrink resistant, and exhibited some resistance to rot and mildew.

We claim:
1. An N-methylol derivative of tris(2-carbamoylethyl)phosphine oxide prepared by reacting tris(2-carbamoylethyl)phosphine oxide with formaldehyde within a range of mole ratios of from 1:1 to 1:6 in an aqueous alkaline solution at room temperature for a time sufficient to form said N-methylol derivative.
2. An N-methylol derivative as in claim 1 wherein the mole ratio of tris(carbamoylethyl)phosphine oxide to formaldehyde is 1:3.

References Cited by the Examiner

UNITED STATES PATENTS

| | | | |
|---|---|---|---|
| 2,203,493 | 6/1940 | Evans et al. | 8—116 |
| 2,234,889 | 3/1941 | Boulton et al. | 8—116 |
| 2,961,465 | 11/1960 | Contois | 260—561 |
| 3,005,013 | 10/1961 | Grayson et al. | 260—561 |
| 3,052,719 | 9/1962 | Buckler et al. | 260—561 |
| 3,067,251 | 12/1962 | Rauhut et al. | 260—561 |

OTHER REFERENCES

Migrdichian: "Organic Synthesis," vol. 1, page 367, New York, Reinhold, 1957.

Noller: "Chemistry of Organic Compounds," 2nd ed., pages 171 and 244–5, Philadelphia, Saunders, 1957.

WALTER A. MODANCE, *Primary Examiner.*

NORMAN G. TORCHIN, JOHN D. RANDOLPH,
*Examiners.*